United States Patent
Seo et al.

(10) Patent No.: US 7,336,889 B2
(45) Date of Patent: Feb. 26, 2008

(54) RECORDING MEDIUM HAVING DATA STRUCTURE FOR MANAGING PRESENTATION DURATION OF STILL PICTURES RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 884 days.

(21) Appl. No.: 10/790,751

(22) Filed: Mar. 3, 2004

(65) Prior Publication Data

US 2004/0175122 A1    Sep. 9, 2004

(30) Foreign Application Priority Data

Mar. 3, 2003 (KR) .................... 10-2003-0013186

(51) Int. Cl.
*H04N 5/91* (2006.01)
*H04N 5/00* (2006.01)

(52) U.S. Cl. .................................. 386/95; 386/125
(58) Field of Classification Search .................. None
See application file for complete search history.

(56) References Cited

U.S. PATENT DOCUMENTS

| 7,054,545 | B2 * | 5/2006 | Ando et al. | 386/96 |
| 2003/0190158 | A1 * | 10/2003 | Roth et al. | 386/125 |
| 2005/0201718 | A1 * | 9/2005 | Kato | 386/46 |

* cited by examiner

*Primary Examiner*—Thai Q. Tran
*Assistant Examiner*—Heather R. Jones
(74) *Attorney, Agent, or Firm*—Harness, Dickey & Pierce, P.L.C.

(57) ABSTRACT

The present invention relates to a recording medium having a data structure for managing presentation duration of at least still pictures recorded thereon. A recording medium having a data structure according to the present invention has a data area storing a still picture stream including at least one still picture having finite presentation duration and at least one still picture having infinite presentation duration; and a management information area storing management information for the still picture stream, said management information having sequence information to divide said still picture stream to a plurality of logical sequences based on the still picture having infinite presentation duration.

14 Claims, 5 Drawing Sheets

| STC_sequence Table | | |
|---|---|---|
| STC_sequence #1 | . . . . | |
| | Presentation_Start_Time • | — PTS 1 in Pictiure 1 |
| | Presentation_End_Time • | — PTS 4 in Pictiure 4 |
| STC_sequence #2 | . . . . | |
| | Presentation_Start_Time • | — PTS k+1 in Pictiure 5 |
| | Presentation_End_Time • | — PTS k+3 in Pictiure 7 |
| STC_sequence #3 | . . . . | |
| | Presentation_Start_Time • | — PTS n+1 in Pictiure 8 |
| | Presentation_End_Time | |
| ⋮ | ⋮ | |

US 7,336,889 B2

RECORDING MEDIUM HAVING DATA STRUCTURE FOR MANAGING PRESENTATION DURATION OF STILL PICTURES RECORDED THEREON AND RECORDING AND REPRODUCING METHODS AND APPARATUSES

FOREIGN PRIORITY

The present invention claims priority under 35 U.S.C. 119 on Korean Application No. 10-2003-013186 filed Mar. 3, 2003; the contents of which are incorporated by reference in their entirety.

BACKGROUND OF THE INVENTION

1. Field of the Invention

The present invention relates to a recording medium having a data structure for managing presentation duration of at least still pictures recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) and Blu-ray Disk ROM (BD-ROM) are examples of these new optical disks.

While the standard for BD-RE has been published, the standardization for high-density read-only optical disks such as the Blu-ray ROM (BD-ROM) is still under way. Consequently, an effective data structure for managing reproduction of still pictures recorded on the high-density read-only optical disk such as a BD-ROM is not yet available.

SUMMARY OF THE INVENTION

It is an object of the present invention to provide a data structure for managing presentation time of still pictures recorded on a recording medium.

Specially, the present invention provides a data structure of a recording medium for managing still pictures having infinite presentation time.

A recording medium having a data structure according to the present invention comprises a data area storing a still picture stream including at least one still picture having finite presentation duration and at least one still picture having infinite presentation duration; and a management information area storing management information for the still picture stream wherein the management information has sequence information to divide the still picture stream to logical sequences based on the still picture having infinite presentation duration.

In one embodiment, the still picture stream is organized to a plurality of logical sequences such that a last still image or picture pertaining to each sequence has infinite presentation duration.

The present invention further provides apparatuses and methods for recording and reproducing the data structure according to the present invention, and recording and reproducing still images or pictures according to the present invention.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, exemplary embodiments thereof will now be described with reference to the accompanying drawings.

Figure 1:
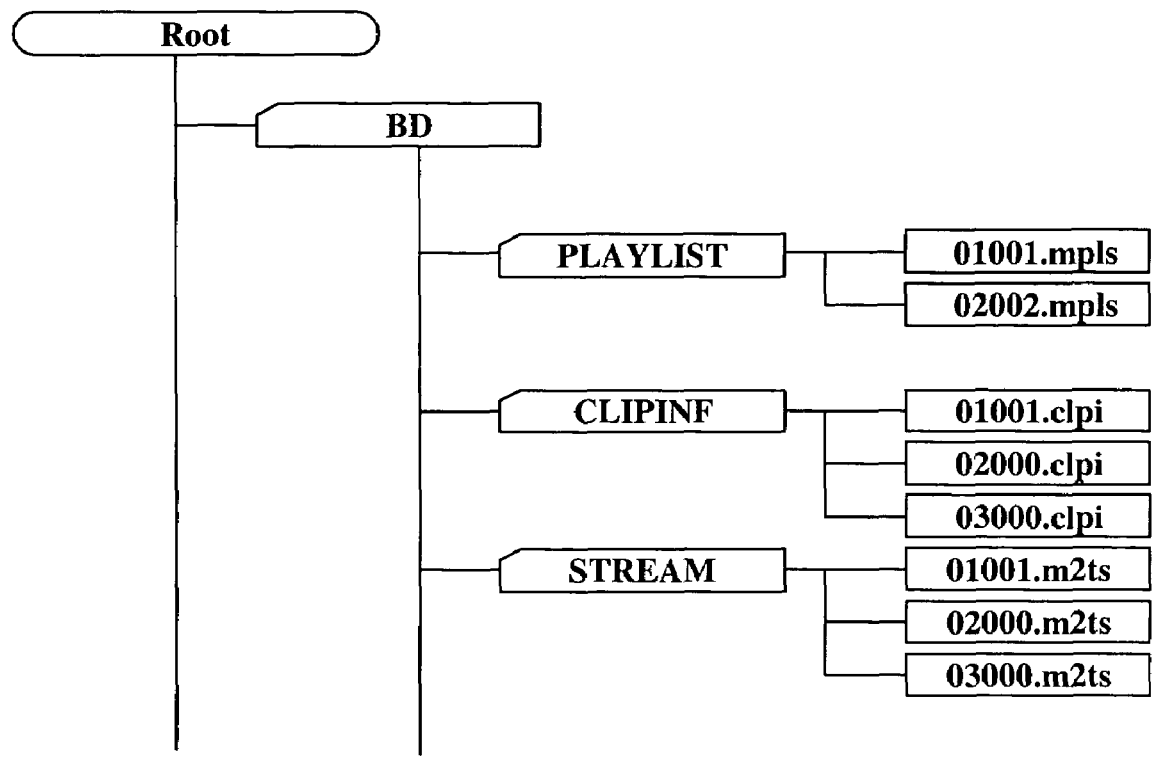
FIG. 1 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will be reviewed, but not described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 2:
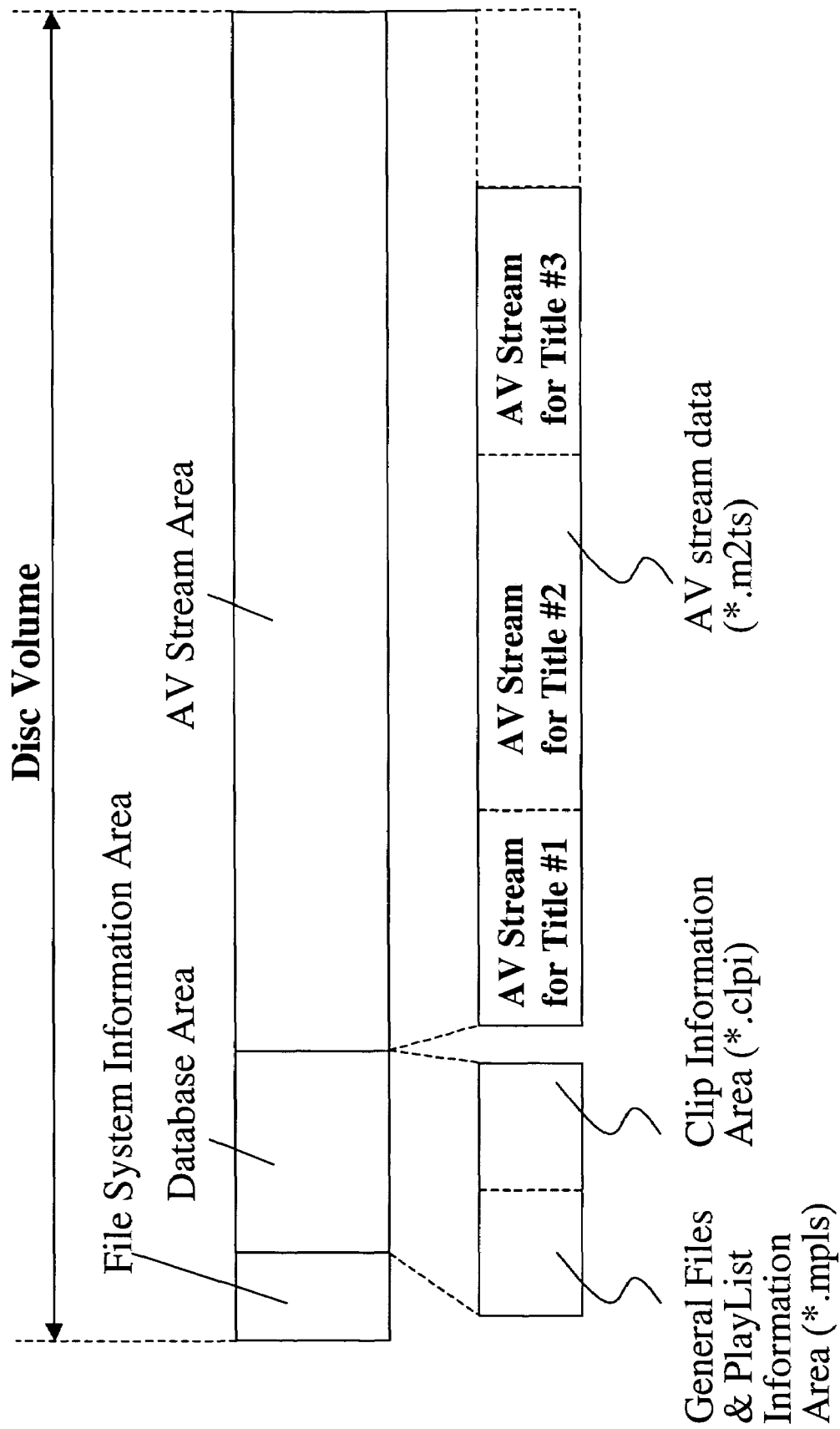
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein and still picture streams as well.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM still images or pictures may be recorded and reproduced in an organized and/or user interactive fashion, for example, as slideshows. The data structure for managing reproduction of still pictures for a high-density recording medium in accordance with embodiments of the present invention will be described along with methods and apparatuses according to embodiments of the present invention for recording and reproducing still images.

Figure 3:
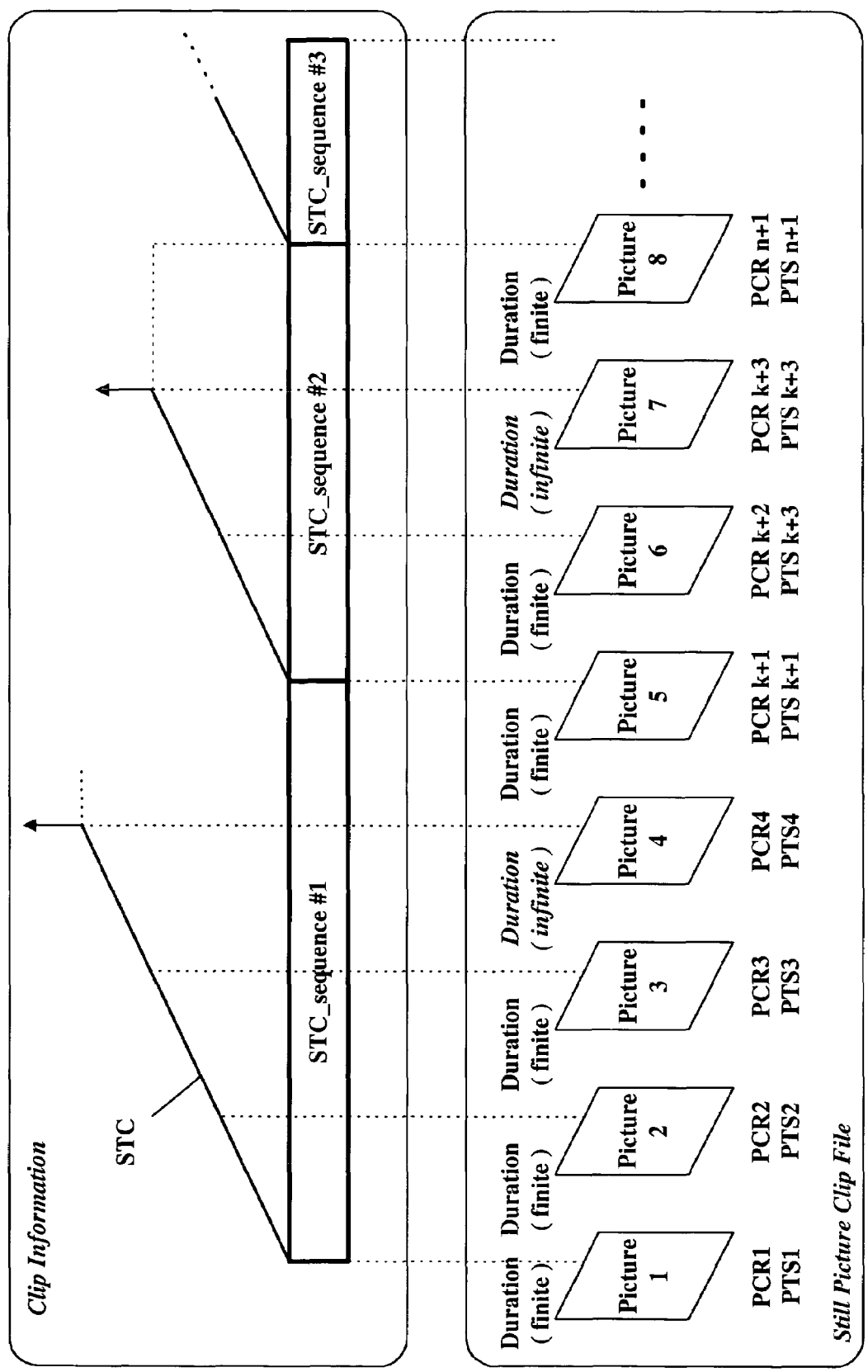
FIG. 3 illustrate a detailed embodiment of still pictures and data structure recorded according to the present invention.
Figures 4, 5:
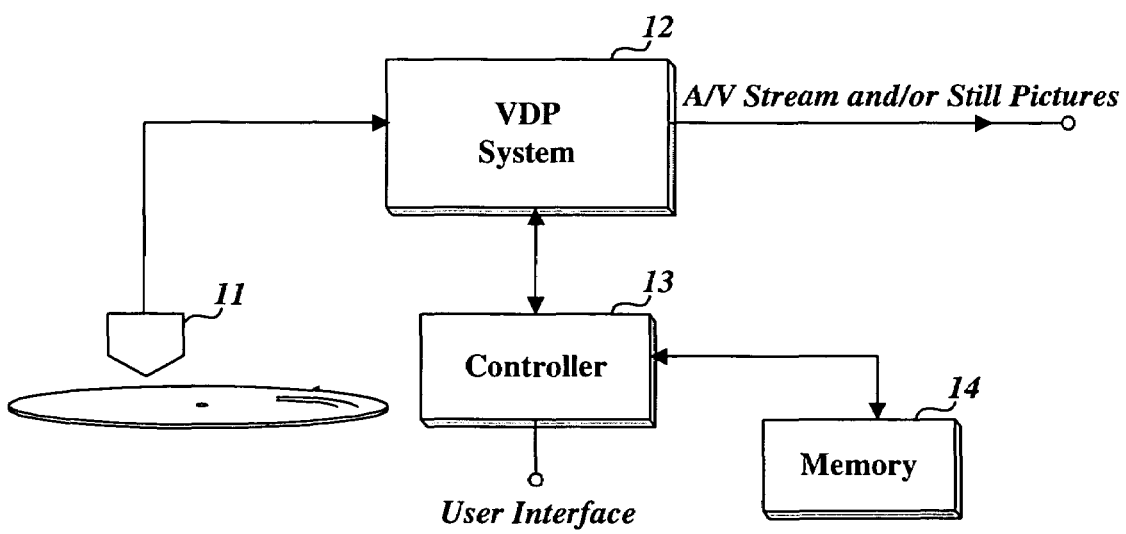
FIG. 4 illustrate a sequence table having information to divide a still picture stream to a plurality of sequences.
FIG. 5 illustrates a schematic diagram of a partial structure of an optical disc reproducing apparatus where the present invention is applied.

Still pictures recorded in the form of MPEG2 transport stream in a physical data recording area of a recording medium (e.g., a BD-ROM) may be managed as a clip file, as shown in FIG. 3. A clip information file associated with the still picture clip file includes various information about still pictures in the clip file. FIG. 4 shows a STC (System Time Clock) sequence table written in the clip information file for the recorded still picture stream. A STC sequence means a section of a data stream, e.g., still picture stream that is produced under same system time clock. Therefore, time information written in still pictures pertaining to same STC sequence changes continuously.

Each still picture includes a PCR (Program Clock Reference) and a PTS as time information and the STC sequence table, as shown in FIG. 4, includes two PTSs 'Presentation_Start_Time' and 'Presentation_End_Time' inserted in a start and a last still picture of each STC sequence.

By the way, a special still image or picture must be presented infinitely if there is no specific user's command while an ordinary still image or picture has a finite presentation time. For example, the fourth picture and the seventh have infinite presentation time.

However, a PTS storing data field of each still picture is limited in size so that time information indicative of infinite presentation time can not be written in that field. Therefore, an embodiment of the present invention to enable infinite presentation of a still picture organizes a picture group up to a still picture having infinite presentation time (IPT) to one STC sequence. For example, the first still picture to the fourth having IPT are logically organized to the first STC sequence and the fifth picture and the seventh having IPT are organized to the second STC sequence. Such logical sequence organization is made by information writing in a clip information file associated with a clip file including those pictures, as described before.

The PCR and PTS to be written in each still image or picture are dependent of the STC sequence organization. In other words, both of start still pictures, e.g., the first and the fifth picture pertaining to different STC sequences have mutually independent PCRs and PTSs that have no time relation respectively each other. Consequently, PCR and PTS of a still picture having IPT, e.g., the fifth picture next to the ordinary fourth picture are newly-set values that are not continuously increased time from those of the fourth one.

FIG. 5 illustrates a schematic diagram of a partial structure of an optical disc reproducing apparatus where the present invention is applied. As shown, the optical disc apparatus includes an optical pickup 11 for reproducing data from an optical disk. A controller 13 controls the reproduction operation of the optical pickup 11 and a VDP (Video Disc Play) system 12 demodulates the data reproduced by the optical pickup 11. The VDP system 12 produces an AV stream through the demodulation. A memory 14 stores data necessary for control operation of the controller 13.

In the event that reproduction of, for example, the still picture clip file of FIG. 3 is requested from a user, the controller 13 recognizes every STC sequence first by examining a clip file information associated with the clip file. Then, the controller 13 controls the optical pickup 11 to reproduce from the first picture of the first STC sequence.

The first picture is reproduced and presented for a specified finite time, and then, next second and third pictures are also presented for their finite time sequentially. If the last picture of the first STC sequence, namely, the fourth is encountered during the sequential reproduction, the controller 13 presents the fourth picture infinitely, namely repeatedly until a specific user's key is entered. The fact that the fourth picture is the last of the first STC sequence can be known from the STC sequence table of FIG. 4 written in the clip information file. A system clock adjusting operation based on PCR written in a still picture may be suspended during the infinite presentation of a picture.

If reproduction of the next picture is requested from a user, the controller 13 controls the optical pickup 11 and the VDP system 12 to reproduce successive still pictures organized to the second STC sequence. At the reproduction beginning of the second STC sequence, PCR written in the start picture, namely, the fifth one is read and used to initialize count of a system clock. The last picture of the second STC sequence is also presented infinitely until a specific key is entered.

The operations conducted as above enable infinite presentation of an arbitrary still image or picture in spite of PTS written as a finite value because of limited-sized PTS field.

Figure 6:
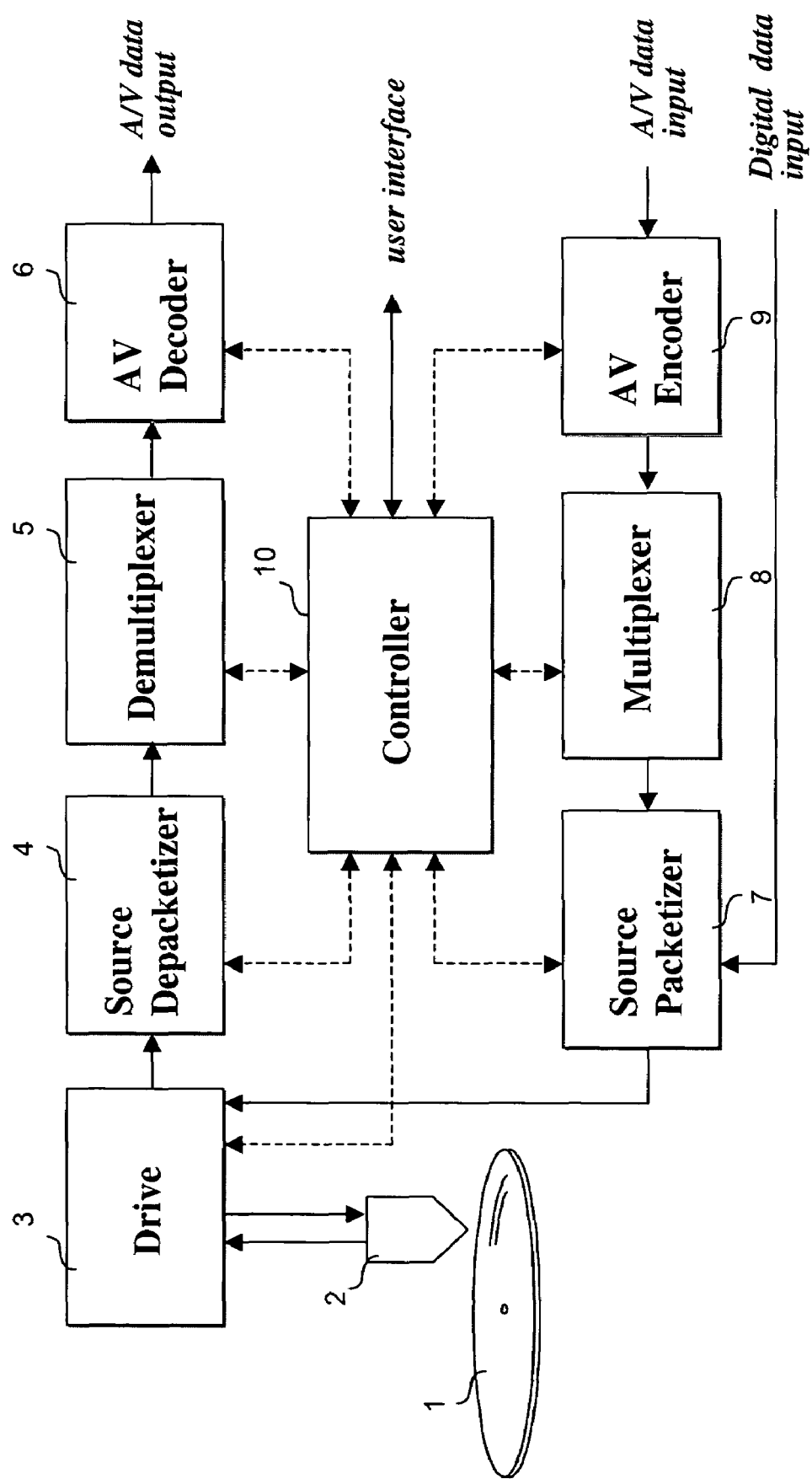
FIG. 6 illustrates another embodiment of a recording and reproducing apparatus according to the present invention.

FIG. 6 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 6, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-4 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced infinitely based on the navigation information, e.g., the STC sequence table in a clip information file. Furthermore, an image or group of images may be reproduced infinitely as a slideshow or portion of a slideshow. Consequently, a still picture is reproduced for a specified finite time or its reproduction may continue infinitely without user's input or command.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9.

During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 6 has been described as a recording and reproducing apparatus, it will be understood that only a recording or only a reproducing apparatus may be provided using those portions of FIG. 6 providing the recording or reproducing function.

The method and data structure of managing still images for a high-density recording medium in accordance with the invention provides various still control operations such as duration management and allows effective display of still images related with menu items.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A computer-readable medium having a data structure for managing presentation duration of still images, comprising:
    a data area storing a still picture stream including at least one still picture having finite presentation duration and at least one still picture having infinite presentation duration; and
    a management information area storing management information for the still picture stream, said management information having sequence information to divide said still picture stream to logical sequences based on the still picture having infinite presentation duration.

2. The computer-readable medium according to claim 1, wherein a last still picture pertaining to each sequence has infinite presentation duration.

3. The computer-readable medium according to claim 1, wherein each of the still pictures has time information including a program clock reference and a presentation time stamp.

4. The computer-readable medium according to claim 3, wherein the time information of a start picture pertaining to a sequence has no time relation with that of a last picture pertaining to a previous sequence.

5. A method for recording a data structure for managing presentation duration of still picture data on a recording medium, comprising the steps of:
   recording on a recording medium a still picture stream including at least one still picture having finite presentation duration and at least one still picture having infinite presentation duration; and
   recording on the recording medium management information for the still picture stream, said management information having sequence information to divide said still picture stream to logical sequences based on the still picture having infinite presentation duration.

6. The method according to claim 5, wherein the still picture stream is divided to the logical sequences such that a still picture having infinite presentation duration is a last picture of each sequence.

7. An apparatus for recording a data structure for managing presentation duration of still picture data on a recording medium, comprising:
   a drive for driving an optical recording means that records data on the recording medium;
   an encoder for encoding the still picture data; and
   a controller for controlling the drive to record the encoded data on the recording medium,
   wherein the controller controls the drive to record a still picture stream including at least one still picture having finite presentation duration and at least one still picture having infinite presentation duration, and to record management information for the still picture stream, said management information having sequence information to divide said still picture stream to logical sequences based on the still picture having infinite presentation duration.

8. The apparatus according to claim 7, wherein the still picture stream is divided to the logical sequences such that a still picture having infinite presentation duration is a last picture of each sequence.

9. A method for reproducing a recording medium having a data structure for managing presentation duration of still picture data thereon, comprising the steps of:
   reproducing from the recording medium a still picture stream including at least one still picture having finite presentation duration and at least one still picture having infinite presentation duration;
   reproducing from the recording medium management information for the still picture stream, said management information having sequence information to divide said still picture stream to logical sequences based on the still picture having infinite presentation duration; and
   making presentation of a last still picture of each sequence infinitely while waiting a specific command from a user.

10. The method according to claim 9, further comprising the step of, if the specific command is entered, starting to reproduce still pictures pertaining to a next sequence.

11. The method according to claim 9, further comprising the step of initialing a system clock using a program clock reference written in a start still picture pertaining to a sequence when starting to reproduce the sequence.

12. An apparatus for reproducing a data structure for managing presentation duration of a still picture data recorded on a recording medium, comprising:
   a drive for driving an optical reproducing device to reproduce data recorded on the recording medium;
   a decoder for presenting the reproduced data; and
   a controller for controlling the drive to reproduce a still picture stream including at least one still picture having finite presentation duration and at least one still picture having infinite presentation duration, and to reproduce management information for the still picture stream, said management information having sequence information to divide said still picture stream to logical sequences based on the still picture having infinite presentation duration,
   wherein the controller further controls the decoder to conduct infinite presentation of a last still picture pertaining to each sequence while waiting a specific command from a user.

13. The apparatus according to claim 12, wherein the controller further controls the drive to reproduce still pictures pertaining to a next sequence, if the specific command is entered.

14. The apparatus according to claim 12, wherein the controller further initializes a system clock using a program clock reference written in a start still picture pertaining to a sequence when starting to reproduce the sequence.

* * * * *